United States Patent [19]

Ang

[11] Patent Number: 5,872,186
[45] Date of Patent: Feb. 16, 1999

[54] SPANDEX BLENDED IN NATURAL RUBBER

[75] Inventor: Pei Pei Ang, Singapore, Singapore

[73] Assignee: E. I. du Pont de Nemours and Company, Wilmington, Del.

[21] Appl. No.: 602,399

[22] Filed: Feb. 16, 1996

[51] Int. Cl.⁶ .................................................. C08L 75/08
[52] U.S. Cl. ........................................ 525/127; 428/295.1
[58] Field of Search .......................... 428/295.1; 525/127

[56] References Cited

U.S. PATENT DOCUMENTS 5,217,801   6/1993   Hamada ................................. 428/295

FOREIGN PATENT DOCUMENTS

| 62-112618 | 5/1987 | Japan | C08G 18/68 |
| 4-13792 | 1/1992 | Japan | C09K 3/10 |
| 5-63508 | 9/1993 | Japan | C08L 83/00 |

OTHER PUBLICATIONS

L. Mielsen; Mechanical Properties of Polymers & Composites; vol. 2; 1974; p. 472.

*Primary Examiner*—Rachel Gorr
*Attorney, Agent, or Firm*—George A. Frank

[57] ABSTRACT

Staple-length fibers of spandex are blended into compounded natural rubber to improve the mechanical properties of the rubber.

6 Claims, 3 Drawing Sheets

SPANDEX BLENDED IN NATURAL RUBBER

BACKGROUND OF THE INVENTION

1. Field of the Invention

This invention relates to a blend of compounded natural rubber and staple fibers. More particularly, the invention concerns such a blend in which the staple fibers are spandex.

2. Description of the Prior Art

It is known to blend fibers into rubber compositions. Typically, fibers of high-strength and high-modulus, such as fibers of nylon, polyester, glass, steel, or aramid fibers, are used in the blends. The blending of other types of fibers in various rubber compositions also is known.

Japanese Patent Application Publication No. 4-13792 discloses elastomeric sheet compositions containing 1 to 15 weight percent of plastic fibers of ultra-fine denier (i.e., 0.001 to 0.9 denier) mixed in a rubber binder composition. Numerous kinds of plastic fibers, as well as numerous kinds of synthetic rubbers and natural rubber, are listed as being suited for use in the composition. The ultra-fine plastic fibers are derived from composite fibers which comprise two or more polymers, preferably nylon and polyester. The composite fibers are splittable into fibers of very fine-denier. Among the many polymers listed as being suited for one of the polymers in the composite bicomponent fibers polyurethane is included.

Japanese Patent Application Publication No. 5-63508 discloses the mixing of polyurethane fibers (spandex) in a liquid silicone rubber matrix, heating the mixture and then pressing the mixture into sheets. A special treatment is employed to adhere the fibers to the silicone rubber.

Japanese Patent Application Publication No. 62-112618 discloses mixing 0.5-cm-long, 40-denier spandex into a liquid polybutadiene diol, reacting the mixture with diphenymethane diisocyanate to form a polyurethane elastomer matrix containing the spandex, and then casting a tire therefrom.

The present inventor found that significant improvements are made in the tensile strength, tear resistance, and elongation at break of a vulcanized sheet of natural rubber, if polyurethane staple fibers (i.e., spandex) are blended into the natural rubber.

SUMMARY OF THE INVENTION

The present invention provides an improved blend of natural rubber and staple fibers. In accordance with the improvement of the invention, the staple fibers are spandex. The spandex preferably has a titre of at least 10 decitex and a length in the range of 4 to 60 millimeters, most preferably 6 to 25 mm. Preferably the spandex constitutes in the range of 3 to 25 %, most preferably 10 to 20%, of the total weight of the improved blend.

The present invention also provides an improved process for making a blend of staple fibers and natural rubber. The process comprises the steps of blending staple fibers with a compounded natural rubber, shaping the blend, and thereafter, optionally vulcanizing the shaped blend. The improvement of the invention comprises employing staple fibers that are spandex, preferably, having a titre of at least 10 dtex and a length in the range of 4 to 60 mm, most preferably 6 to 25 mm, and blending the spandex into the natural rubber composition in an amount that constitutes 3 to 25%, preferably 10 to 20%, of the total weight of the blend.

BRIEF DESCRIPTION OF THE DRAWINGS

The invention is more readily understood by reference to the drawings, which are graphs of certain mechanical properties of vulcanized natural rubber containing spandex as functions of the amount of spandex in a vulcanized compounded natural rubber specimen; namely tensile strength in FIG. 1, break elongation in FIG. 2 and tear resistance in FIG. 3.

DETAILED DESCRIPTION OF PREFERRED EMBODIMENTS

Figure 1:
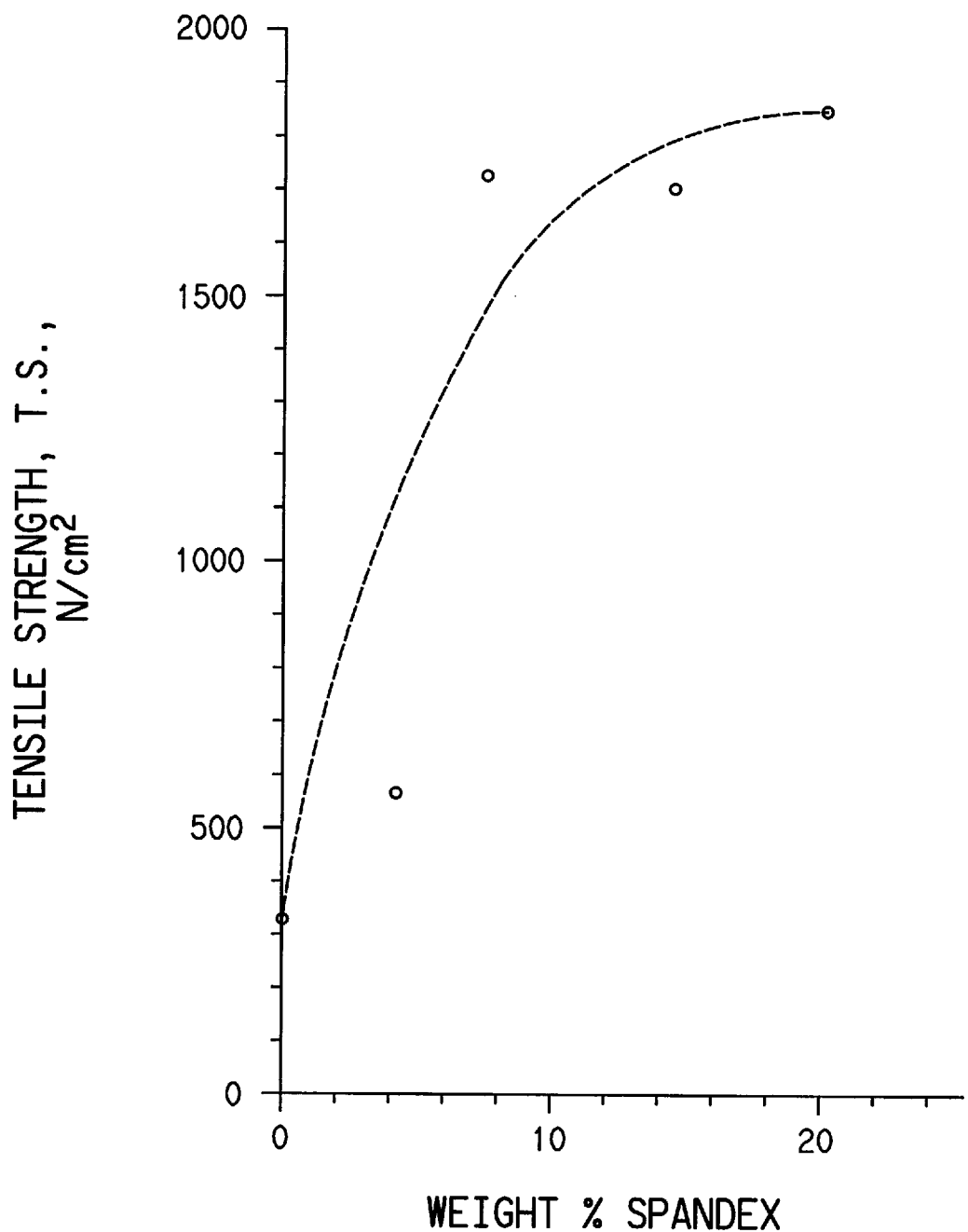

As used herein, the term spandex means a manufactured monocomponent fiber in which the fiber-forming substance is a long chain synthetic elastomer comprised of at least 85% by weight of a segmented polyurethane. "Natural rubber" means a coagulated sap of the tropical tree Hevea brasiliensis, of the guayule bush Parthenium argentatum, or of the like.

Conventional processes for making vulcanized rubber articles typically include the steps of (1) mechanically masticating the rubber, (2) adding compounding ingredients to the rubber with further mechanical working to form a compounded rubber, (3) rolling the compounded rubber into sheet or forming the compounded rubber into some special shaped article, and (4) vulcanizing the sheet or article, usually by application of heat and pressure.

According to the present invention, natural rubber is blended with spandex which has been cut into short lengths. In most conventional uses, spandex is employed as very long or continuous filaments. However, for use in the present invention, the spandex is cut into staple-fiber lengths, typically in the range of 4- to 60-mm long, preferably 6- to 30-mm long. As used herein these length ranges are intended to indicate that at least 80 weight percent of the spandex fibers have the specified lengths. Longer and shorter fibers also can be present. Typically, the spandex suited for use in the blends has a titre of at least 10 decitex. Spandex titres of very much greater than 10 dtex can be used in the compounded natural rubber blends of the invention. For, example, spandex titres of greater than 100 dtex, or even greater than 1,000 dtex can be employed. Conventional cutting equipment, such as Sprout-Bauer cutter/grinders and associated equipment (i.e., vacuum, conveyors, etc.) are suitable for cutting the spandex.

Various types of spandex are suited for use in the invention, such as polyetherurethanes, polyesterurethanes, polyetherurethaneureas, polyesterurethaneureas or the like. Polyetherurethaneureas are preferred. Conventional spandex additives, such as antioxidants, UV-light stabilizers, chlorine resist agents, inorganic pigments, anti-tack agents, lubricating oils, and the like may present in the spandex.

In addition to the cut spandex, the compounded rubber of the blend usually contains conventional rubber additives, such as vulcanizing agents, vulcanization accelerators, accelerator activators, accelerator retardents, antioxidants, coloring pigments, fillers, plasticizers, antioxidants, blowing agents and the like. When a vulcanizing agent is employed in the present invention, the vulcanizing agent typically is activated after the cut spandex has mixed with the remainder of the compounded rubber.

Conventional rubber masticating or mixing equipment can be used to blend the staple spandex and other compounding ingredients with the natural rubber. Milling machines and various calender rolls typically are employed. A two-roll mill is used in the Examples presented below.

According to the invention, cut spandex typically is blended into natural rubber in amounts as high as 30 parts per hundred parts of natural rubber (PHR), or even higher. In the final blend, the cut spandex typically constitutes 3 to 25%, preferably 10 to 20%, of the total weight of the blend.

A compounded natural rubber blended with spandex in accordance with the invention, after vulcanization, surprisingly has considerably improved mechanical properties, as compared to the same vulcanized compounded natural rubber containing no spandex. In particular, tensile strength, elongation-to-break and tear resistance are unexpectedly and desirably increased, without significant adverse effects on the hardness or dynamic fatigue of the vulcanized natural rubber. Also, in contrast to most synthetic rubbers (e.g., chlorinated isobutylene/isoprene, polybutadiene, ethylene/propylene diene, butadiene/acrylonitrile, styrene butadiene, polychloroprene), the natural rubber provides a matrix in which the spandex is incorporated quite readily and in sufficient quantities to favorably affect the mechanical properties of the rubber.

The preceding discussion and the examples which follow mention various properties that are determined herein in accordance with designated test methods of The American Society for Testing and Materials (ASTM).

Tensile strength, TS, in Newtons per square centimeter and elongation at break, $E_b$, in percent are each determined by ASTM Test Method D 412-87 (5 IT) at an elongation rate of 300 mm per minute with test specimens prepared according to ASTM D 3183-84. Each value reported herein is an average of eight determinations per rubber blend.

Tear resistance, TR, in kiloNewtons per meter thickness of specimen, is determined by ASTM D 624-86 with test specimens prepared according to ASTM-D 3183-84. Reported values herein are averages of multiple determinations.

Hardness, H, in Newtons, is determined according to ASTM D 2240-86 (Type A). Each reported value is an average of five determinations.

Dynamic fatigue is evaluated by ASTM D 430-73 (88) with De Mattia test specimens prepared in accordance with ASTM 3183-84. At least three specimens per rubber blend are exposed to cyclic testing.

Compression recovery, CR, is evaluated by ASTM D 575-88 and is expressed as a % of the height of a cylindrical sample that is not recovered after the sample is released from 72 hours of compression. Each reported % of height not recovered is an average of ten measurements per rubber blend.

Compounded natural rubber containing staple fibers of spandex in accordance with the invention are useful for a wide variety of elastomeric products such as liners, carpet underlay, conveyor belts, sound damping sheets for automobiles, and the like.

EXAMPLES

In the examples which follow, several blends of compounded rubber and spandex were prepared. Sri Lankan crepe natural rubber and LYCRA® spandex (manufactured by E. I. du Pont de Nemours & Co.) were blended to form each sample. The LYCRA® spandex was prepared by conventional dry-spinning of a solution of a polyurethaneurea in dimethylacetamide solvent. The polyurethaneurea was formed by reacting a poly(tetra-methyleneether)glycol with methylene-bis(4-phenylisocyanate) to produce an isocyanate-capped prepolymer that was then chain extended with a 90/10 mixture of ethylene diamine and 2-methylpentamethylene diamine. The filaments of the spandex yarn had a titre of 40denier (44 dtex) and contained as additives: METHACROL® 2138F copolymer of diisopropyl- aminoethyl methacrylate and n-decyl methacrylate made by E. I. du Pont de Nemours & Co.; CYANOX® 1790, 1,3,5-tris(4-1-butyl-3-hydroxy-2,6-dimethyl-benzyl)-1,3,5-triazine-2,4,6(1H,3H,5H)trione antioxidant sold by Cytec Inc.; barium sulfate; silicone oil; and sometimes, zinc oxde. All yarns were cut into lengths in the range of 0.6 to 2.5 cm. Then, a conventional 6-inch-by 13-inch (15.2-cm-by-33-cm) two-roll model S09483 Carter mill, made by Carter Brother (Rochdale) Ltd., England was used to to blend the rubber samples. Samples of the invention 1–4, respectively were blended with 5, 10, 20, and 30 parts of cut spandex per hundred parts of rubber (PHR). Comparison Sample A was prepared with no spandex in the sample. Except for the PHR of spandex, the compounding agents for Samples A, 1, 2 and 3 were in accordance with Formulation I (given specifically for Sample 3) of Table I below. Formulation II was employed for Sample 4. In the table, the concentration of each compounding agent also is listed in weight % of the total formulation.

TABLE I

| Formulation | I | | II | |
| --- | --- | --- | --- | --- |
|  | PHR | Wt. % | PHR | Wt. % |
| Natural rubber | 100 | 72.6 | 100 | 67.4 |
| Antioxidant† | 1.3 | 0.9 | 1.3 | 0.9 |
| Spandex | 20 | 14.5 | 30 | 20.2 |
| Colored pigment | 1.4 | 1.0 | 1.4 | 0.9 |
| Titanium dioxide pigment | 1.5 | 1.1 | 1.5 | 1.0 |
| Wax plasticizer | 2.3 | 1.7 | 2.3 | 1.6 |
| Stearic acid activator | 2.0 | 1.4 | 2.0 | 1.3 |
| Zinc oxide activator | 5.1 | 3.7 | 5.1 | 3.5 |
| Primary accelerator‡ | 1.1 | 0.8 | 1.1 | 0.7 |
| Secondary accelerator* | 0.2 | 0.1 | 0.7 | 0.5 |
| Sulfur vulcanizing agent | 3.0 | 2.2 | 3.0 | 2.0 |
| Total | 138. | 100 | 148. | 100 |

Notes:
†4-ethyl-6-t-butylphenol;
‡2,2-dithio-bis(benzothiazole);
*70% tetramethyl thioram disulphide in natural rubber master batch.

The ingredients of the above formulations were incorporated into the natural rubber in one-kilogram batches with the two-roll mill. In the conventional manner of rubber formulation compounding, the metal rolls of the mill were run at different surface speeds to promote the mixing, tearing, kneading and mastication of the formulation. The rolls were internally cooled with water to carry off the heat generated by the mastication. In the blending step, the nip between the rolls (i.e., the narrowest spacing between the surfaces of the rolls) initially was set at 5 mm. The ingredients of the formulation were added to the natural rubber in the order listed in Table 1 (i.e., antioxidant, spandex staple fibers, colored pigment, titanium dioxide, plasticizer, activators, accelerators, and vulcanizing agent, in succession). After two minutes of milling, the nip between the rolls was decreased to 2 mm and the milling continued for another fifteen minutes. Finally, single bands of the compounded rubber were cut from the rolls for further processing into vulcanized test specimens. The test specimens, measuring 6.7-cm wide by 10.7-cm long by 2-mm thick were formed from the compounded rubber sample by compression molding and vulcanization in a chrome mold under a compression of 1,500 psi (10,350 kiloPascals) and a temperature of 155°0C. for six minutes.

Table II below records the measured tensile strength (TS), break elongation ($E_b$), tear resistance (TR), hardness (H) and compression (non-) recovery (CR) of the vulcanized specimens.

TABLE II

| Example | A | 1 | 2 | 3 | 4 |
|---|---|---|---|---|---|
| Spandex content | | | | | |
| PHR | 0 | 5 | 10 | 20 | 30 |
| Weight % | 0 | 4.1 | 7.8 | 14.5 | 20.2 |
| Properties | | | | | |
| TS, N/cm$^2$ | 322 | 571 | 1733 | 1704 | 1848 |
| E$_b$, % | 360 | 431 | 675 | 719 | 716 |
| TR, kN/m | 27 | 33 | 33 | 33 | 37 |
| H, N | 4.0 | 4.0 | 4.1 | 3.8 | 3.8 |
| CR, % | 0.6 | 1.2 | 2.4 | 2.5 | 2.8 |

Figure 2:
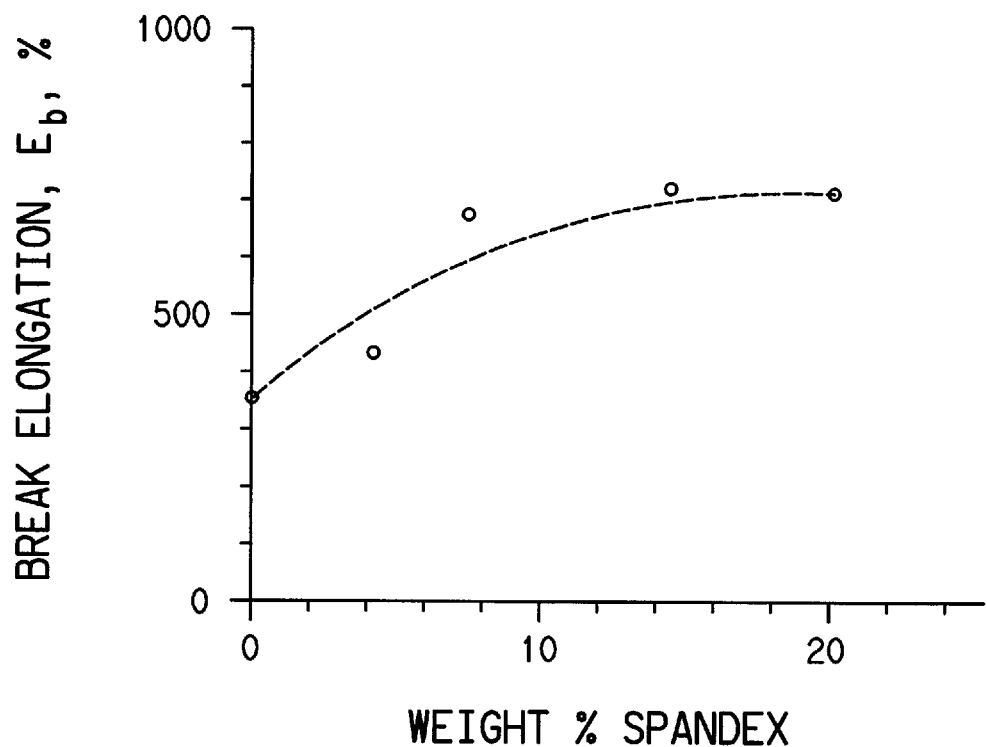
Figure 3:
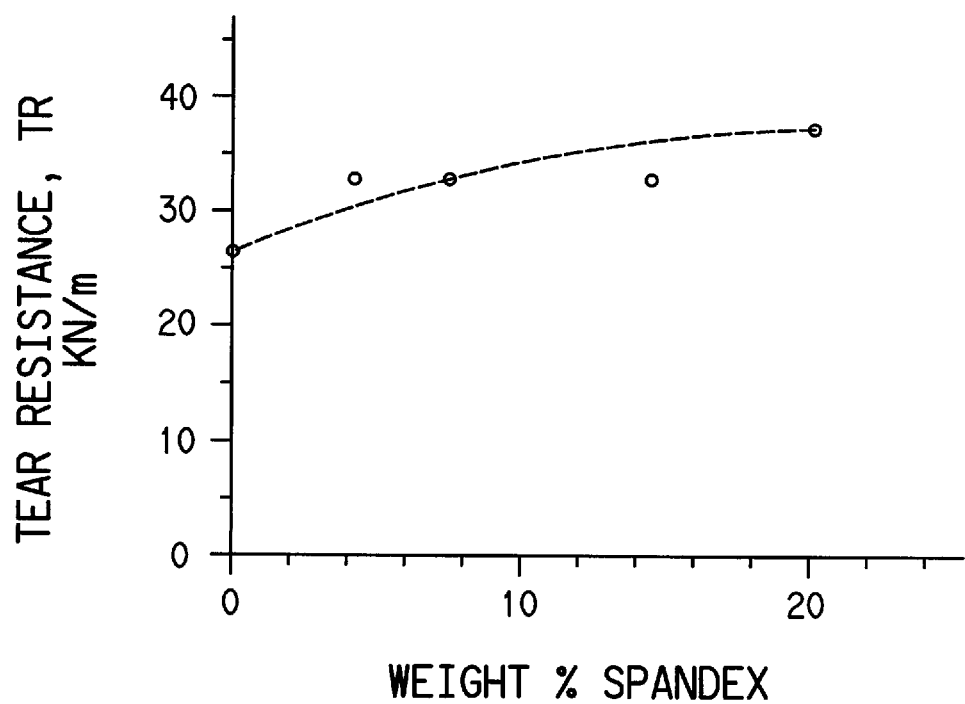

Comparison of vulcanized natural rubber specimens containing spandex (Examples 1–4) with such vulcanized natural rubber specimens containing no spandex (Comparison sample A) showed that the presence of staple lengths of spandex in the vulcanized natural rubber, increased the rubber tensile strength by a factor as high as 5.7, the break elongation by a factor as high as 2 and the tear resistance by a factor as high as 1.4. The improvements in tensile strength, break elongation and tear strength are plotted in FIGS. 1–3 respectively as functions of the weight percent of spandex (based on the total weight of spandex and compounded rubber). In all samples of the invention, measurements also showed that the presence of spandex in the natural rubber had a negligible effect on hardness of the rubber, no deleterious effects on dynamic fatigue of the samples in tests of up to 15,000 cycles or more, and resulted in less than a 3% unrecoverable loss in thickness after release from prolonged compression (%CR).

I claim:

1. A blend of staple fibers and a natural rubber composition wherein the fibers are spandex fibers and have a titre of at least 10 decitex and a length in the range of 4 to 60 millimeters and constitute in the range of 3 to 25% of the total weight of the blend.

2. A blend according to claim 2 wherein the fibers have a length in the range of 6 to 25 millimeters and constitute in the range of 10 to 20 % of the total weight of the blend.

3. A blend according to claim 2 in the shape of a flat sheet.

4. A blend of claim 2 wherein the blend is vulcanized.

5. An improved process for preparing a blend of fibers and natural rubber, wherein staple fibers are blended with natural rubber and the blend is optionally vulcanized, the improvement comprising the staple fibers being spandex having a titre of at least 10 decitex and a length in the range of 4 to 60 mm and constitute 3 to 25% of the total weight of the blend.

6. A process according to claim 5 wherein the fiber length is in the range of 6 to 25 mm and the fibers constitute 10 to 20% of the total weight of the blend.

* * * * *